United States Patent [19]

Gilmont

[11] 4,218,927
[45] Aug. 26, 1980

[54] PRESSURE GAUGE
[75] Inventor: Roger Gilmont, Douglaston, N.Y.
[73] Assignee: Gilmont Instruments, Inc., Great Neck, N.Y.
[21] Appl. No.: 57,400
[22] Filed: Jul. 13, 1979
[51] Int. Cl.² ............................................. G01L 21/04
[52] U.S. Cl. ...................................................... 73/752
[58] Field of Search .......................................... 73/752
[56] References Cited
U.S. PATENT DOCUMENTS

| | | | |
|---|---|---|---|
| 2,535,492 | 12/1950 | Flosdorf | 73/752 |
| 2,584,945 | 2/1952 | Todd | 73/752 |
| 3,122,923 | 3/1964 | Gilmont | 73/752 |
| 3,145,569 | 8/1964 | Gilmont | 73/752 |
| 3,417,622 | 12/1968 | Gilmont | 73/752 |

OTHER PUBLICATIONS

"New Tilting Gage Improves," Research/Development, Nov. 1962, pp. 50-52.

*Primary Examiner*—Donald O. Woodiel
*Attorney, Agent, or Firm*—James & Franklin

[57] ABSTRACT

McLeod gauge has controllable fluid communication between the top of the closed end capillary and the top of the comparison capillary to enable easy degassing of the closed end capillary, thereby enabling optional use of low density non-volatile pressure measuring fluids in place of mercury.

9 Claims, 3 Drawing Figures

PRESSURE GAUGE

BACKGROUND OF THE INVENTION

The present invention relates to pressure gauges and in particular to an improved McLeod gauge suitable for use with mercury or other fluids.

McLeod gauges are well known in the art and come in a variety of different forms including the swivel type, the piston type and the tilting type. See U.S. Pat. No. 3,417,622 for an example of an improved swivel type McLeod gauge; U.S. Pat. No. 3,122,923 for an example of an improved piston-type McLeod gauge and *Vacuum Technology* (November 1962), pages 50–52 for an example of an improved tilting type McLeod gauge.

Commercial McLeod gauges generally employ mercury as the fluid used to compress the gas—i.e., the pressure measuring fluid. While such gauges have been found to be generally satisfactory in use, there exist particular applications for which they are unsuitable due to the possibility of mercury vapor escaping from the gauge into the system whose pressure is to be measured—e.g., biological systems wherein mercury would act as a poison, high vacuum systems wherein the mercury vapors would interfere with ionization gauges or condense on gold or silver surfaces and cause dangerous amalgamation, etc.

McLeod gauges employing a fluid other than mercury have been used in research work. Typically such gauges utilize in place of the mercury a low density, non-volatile fluid, such as silicone oil. Not only do these gauges avoid the danger arising out of the presence of mercury vapor, but because of the lower density of the silicone oil relative to mercury, the sensitivity of the gauges is increased by a factor of almost 15. Furthermore the silicone oil is far cheaper than mercury, an importent consideration in light of the high volume of fluid required. On the other hand, the silicone oil McLeod gauges have not been successfully used on a commercial basis because liquids like silicone oil have a relatively high gas absorption compared to mercury. Thus gas from the liquid evolves in the closed end of the gauge during storage and gives anomalous readings unless highly complex apparatus is used to degas the liquid prior to use. Thus there remains a need for a McLeod gauge capable of utilizing a liquid other than mercury and yet not requiring complex degassing apparatus.

Accordingly, it is an object of the present invention to provide a McLeod gauge suitable for use with either mercury or low density nonvolatile fluids, such as silicone oil.

Another object is to provide such a gauge in which the fluid may be degassed by a simple process adequate to remove all evolved gases and yet not requiring complex degassing apparatus.

A further object is to provide such a gauge which is less expensive to manufacture than a mercury McLeod gauge.

It is yet another object of the present invention to provide such a gauge capable of utilizing a low density, non-volatile fluid and thus affording a greater sensitivity than a similar gauge utilizing mercury.

SUMMARY OF THE INVENTION

It has now been found that the above and related objects of the present invention are obtained by providing a mechanism by which the top of the "closed" capillary or passage of the gauge (that is, the portion of the "closed" passage above the level of the pressure measuring liquid) may be placed in the fluid communication with the system the pressure of which is to be tested, thereby enabling the vacuum of the system to remove any gas trapped between the top of the closed passage and the level of the liquid and thereby to cause degassing of the liquid.

More particularly, in its conventional aspects the pressure gauge comprises a body having a first passage corresponding to the conventional comparison" capillary, a second passage corresponding to the conventional "closed" capillary, and a reservoir adapted to contain a supply of pressure measuring liquid. The body further includes first fluid communication means between one end of each of the passages (typically the lower ends) and the reservoir, the other end of the first passage (typically the upper end) being adapted to be connected to the source the pressure of which is to be measured. Means are further provided for causing the liquid in the reservoir to enter and leave the passages (typically through the lower ends thereof), the precise form of this means depending upon whether the gauge is of a piston, swivel or tilting type. The gauge is adapted to be used in conjunction with scale means associated with the passages for reading the level of liquid in the passages.

In its novel aspects, the present invention comprises second fluid communication means within the body between the other ends of the first and second passages, and means operably connected to the other end of the second passage and movable between first and second positions. The movable means in the first position closes the other end of the second passage from the second communication means, and in its second position opens the other end of the second passage to the second fluid communication means. Preferably the movable means is rotatably disposed within the other end of the second passage and is a controllable valve means. More specifically the second passage may include an internally threaded portion and the movable means may include an externally threaded portion, the movable means portion being in threaded rotatable engagement with the second passage portion.

The gauge may also include system isolating means operatively connected to the other end of the first passage and movable between first and second positions. The system isolating means in the first position is adapted to isolate the first passage from the pressure source and in the second position to allow fluid communication between the source and the first passage. Preferably the system isolating means is a controllable valve means. The other end of the second passage and the source are in fluid communication only when the movable means and system isolating means are both in the second position.

While the reservoir may contain mercury as the pressure measuring liquid, it preferably contains a low density, non-volatile liquid such as silicone oil. In order to simply and easily degas the pressure measuring liquid, the gauge, with both its movable means and system isolating means in their first or closed position, is connected to the source whose pressure is to be tested. The movable means is then moved towards its second or open position, and finally the system isolating means is slowly and carefully moved to its second or open position, thereby providing for fluid communication between the source and the gas trapped in the second passage between the liquid and the top thereof. The trapped gas exits the gauge through the movable means, the second fluid communication means, and the system isolating means into the source. The pressure measuring liquid will bubble as it degasses. After the bubbling is stopped, the movable means is moved to its first or closed position and the gauge is ready for conventional usage. After the desired readings have been taken, and before the gauge is disconnected from the source, the system isolating means is preferably moved to its first or closed position to reduce the gas uptake after separation of the gauge from the source, thereby to reduce the amount of time subsequently required to degassify the liquid.

DETAILED DESCRIPTION OF THE PREFERRED EMBODIMENTS

Figure 1:
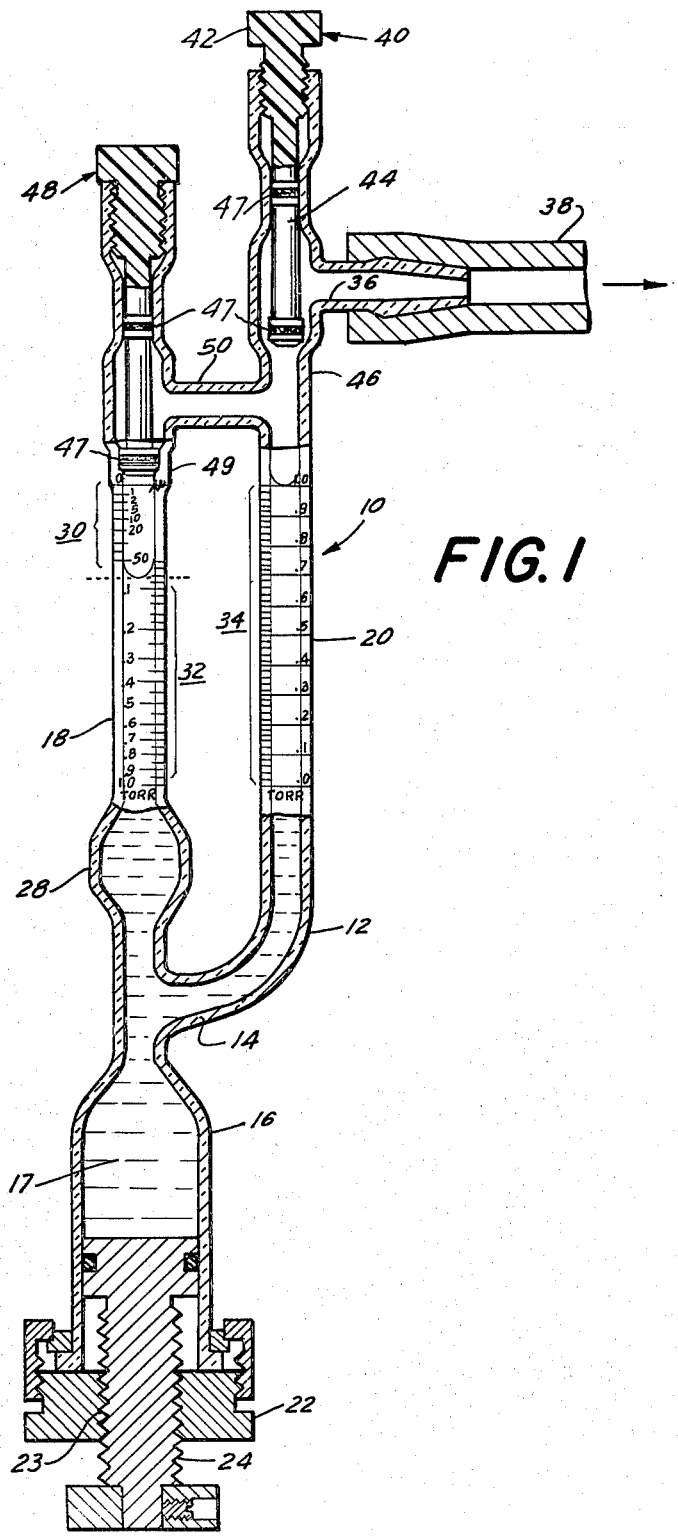
FIG. 1 is a front elevation view of a piston type McLeod gauge according to the present invention.

Referring now to the drawing, and in particular to FIG. 1 thereof, therein illustrated is a piston type McLeod gauge, generally designated 10, according to the present invention. The gauge 10 includes a generally Y-shaped housing or body 12 including a junction portion 14. A lower tube 16, defining a liquid reservoir 17, depends downwardly from portion 14 and a pair of tubes 18, 20 extends upwardly therefrom. The upper part of lower tube 16 and the bottom parts of the upper tubes or passages 18, 20 are in fluid communication via the junction 14.

The bottom of lower tube 16 is sealed by a cap 22 defining an internal threaded aperture 23 through which passes an externally threaded piston 24. Rotation of piston 24 in such a direction as to cause its ascent causes the pressure measuring liquid in reservoir 17 to enter the tubes 18, 20, while rotation in the opposite direction (and the piston's descent) causes the liquid in tubes 18, 20 to return to reservoir 17. As the features of the lower tube 16 and piston 24 assembly are conventional in design, they will not be described in further detail herein.

The upwardly extending tube 18 includes adjacent the junction 14 a bulbous gas-trapping section 28. Immediately above the bulbous gas-trapping section 28 the upwardly-extending tube 18 is provided with a non-linear scale, the upper portion 30 thereof being adapted to measure pressures on the order of 0.001–0.05 mm. of mercury (Torr) in microns and the lower portion 32 thereof being adapted to read pressures on the order of 0.05–1.0 mm of mercury (Torr) in millimeters. The graduations to be used are, of course, specific to a given measuring liquid, whether that liquid be mercury or another measuring liquid.

The upwardly-extending tube 20 is provided with a linear scale 34 adapted to read pressures on the order of 0–1.0 mm of mercury (Torr) in millimeters. The upper portion of the tube 20 is provided with a nipple 36 adapted to be connected, for example, by flexible tubing 38, to the system whose vacuum is to be measured. If desired, the nipple 36 may include a check valve. In the top of the tube 20 is a controllable system isolating valve 40 comprising a head 42 and a valve stem 44. The head 42 extends upwardly from the top of tube 20 to facilitate rotation of the valve stem 44. The upper portion of valve stem 44 is externally threaded and the top of tube 20 is internally threaded so that rotation of the valve 40 causes the valve 40 to rise or lower. The bottom of valve stem 44 and the segment of the upper portion of tube 20 disposed below the level of nipple 36 are configured and dimensioned so that when the valve 40, containing elastomeric O-rings 47 or equivalent, is in its lowered or closed position the bottom of the valve stem 44 seals the upper portion of the tube 20 at point 46, thereby blocking fluid communication between the nipple 36 and the lower portion of the tube 20. Upon rotation of the valve 40 to its higher or open position, the valve stem 44 retreats from the sealing point 46 thereby enabling fluid communication between the nipple 36 and the lower portion of tube 20 and thus exposing the lower portion of tube 20 to the vacuum system to be measured. The valve arrangement described represents an improvement over the conventional stopcock arrangement conventionally used to perform the same function of controlling exposure of the lower portion of tube 20 to the system whose vacuum is to be measured.

With the exception of the replacement of the conventional stopcock by the valve 40, the gauge described hereinabove is of conventional design. However, unlike a conventional gauge wherein the top of tube 18 would be sealed, in the present gauge the upper portion of tube 18 is configured and dimensioned to receive a valve 48 (similar to valve 40) which seats at point 49 and there is provided a transversely-extending passage 50. The passage 50 provides fluid communication between tube 18 above valve sealing point 49 and tube 20 below valve sealing point 46. Thus when valve 48 is in its raised position, the gas trapped above the measuring fluid level in tube 18 is capable of escaping via passage 50 into tube 20 and, if valve 40 is also in its raised position, through nipple 36, out of the gauge and into the vacuum system. Once the gas is evacuated from the tube 18, valve 48 is again moved to its closed position. It will be readily apparent to those skilled in the art that valve 48 may be replaced by an appropriate stopcock performing a similar function of permitting or blocking fluid communication between tube 18 and passage 50, as desired.

When the pressure in a system connected to the nipple 36 is to be measured, one of two procedures may be followed, depending upon the degree of accuracy required and the magnitude of the vacuum involved. When the pressure involved is in the range of 0.2 to 1 mm. of mercury, taking a reading on the linear scale 34 will usually be satisfactory. In this measurement mode, the piston 24 is rotated about its axis to cause its ascent, thereby causing the pressure measuring fluid in the reservoir of lower tube 16 to be forced upwardly through junction 14 and into upper tubes 18 and 20. Before the liquid reaches the junction 14, both the tubes 18 and 20 will be filled with gas from the system under test. The upper end of tube 18 is closed and sealed by the valve 48 in its closed position. On the other hand, the upper portion of tube 20 is in fluid communication through the open valve 40 and nipple 36 with the system under test. As the liquid flows into the tubes 18 and 20, the gas to the left of the intersection of the junction 14 will be trapped and forced up into the tube 18, thus becoming compressed so that its pressure increases. The piston 24 is rotated until the upper level of the liquid in tube 18 just reaches the lowermost graduation on the scale 32. This will produce a predetermined degree of compression of the trapped gas, and therefore will raise its pressure by a predetermined and known factor. The upper level of the liquid in the tube 20, however, acts against the lower pressure of the system under test. As a result it will be forced to a higher level than the liquid in the tube 18, and the difference between the two levels is a measure of the system pressure and readable on the linear scale 34 of tube 20.

If one wishes to check this reading or, more usually, if more intense degrees of vacuum are to be measured, such as those involving a pressure the equivalent of less than 0.2 mm. of mercury, the piston 24 is further rotated. As a result, more of the pressure measuring liquid will flow from the reservoir of lower tube 16 through the junction 14, and the levels of liquid in the tubes 18 and 20 will rise. For the more accurate measurement mode now being discussed, the piston 24 should be rotated until the level of liquid in the tube 20 comes just opposite the uppermost graduation on the liner scale 34. The level of liquid in tube 18 will also have risen, thereby further compressing the volume of gas trapped within the tube 18 and further increasing its pressure. The level of liquid in the tube 18 is read against the non-linear scale 30, 32, that scale indicating the pressure of the gas in its initial condition and hence the pressure of the system under test. In the example illustrated in FIG. 1, a pressure of 80 microns or millitorr is indicated on scale 30.

Figure 2:
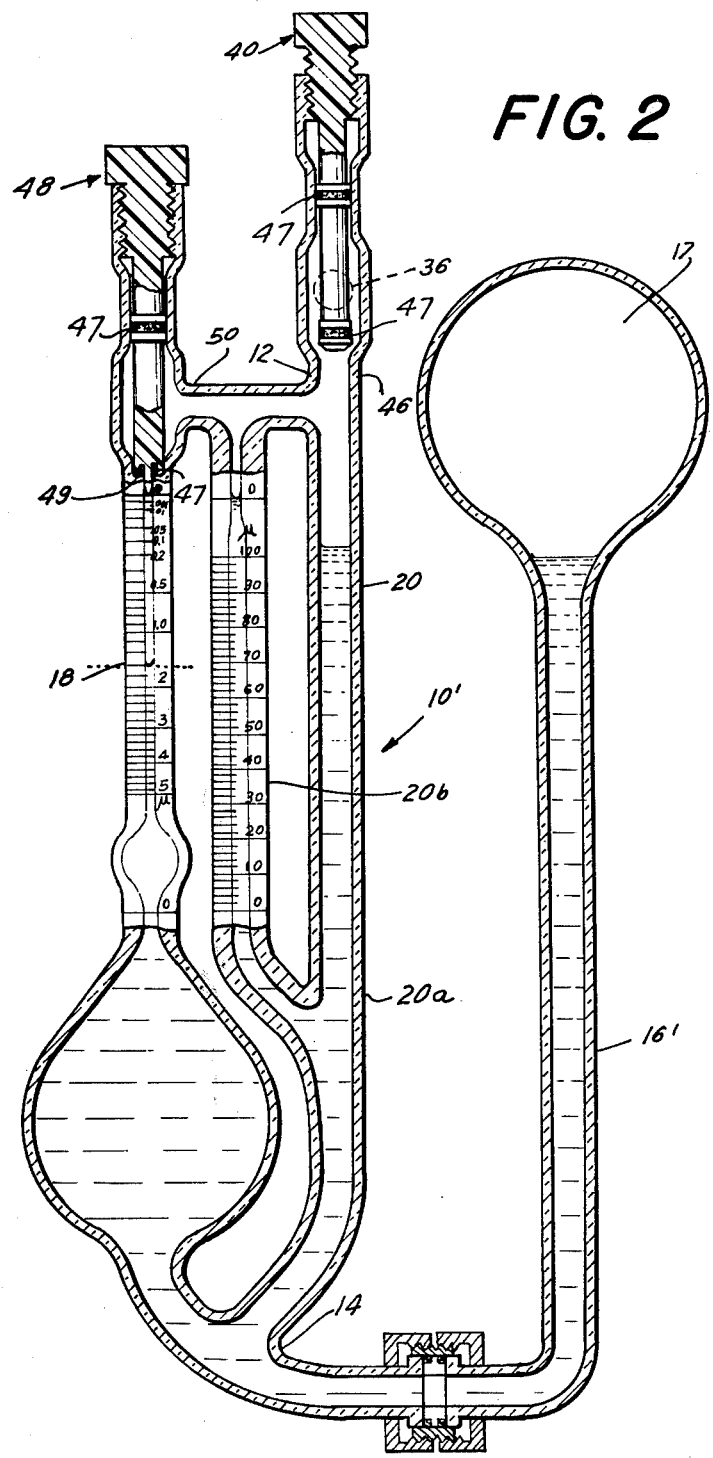
FIG. 2 is a front elevation view of a swival type McLeod gauge according to the present invention.

Referring now to FIG. 2, therein illustrated is a swivel type McLeod gauge, generally designated 10', according to the present invention. The gauge is generally of the type described in U.S. Pat. No. 3,417,622, issued Dec. 24, 1968 to Roger Gilmont. The gauge 10' is similar to the piston type gauge 10 except that, instead of a lower leg 16, a swivel arm 16' having a bulbous distal end or reservoir 17 is used to drive measuring liquid through the junction 14 and into the arms 18, 20. Furthermore the tube 20 includes a bypass 20a and a main portion 20b in fluid communication at all times (both at the top and bottom thereof) with the bypass 20a. The internal capillary diameter of main portion 20b is extremely narrow so that it is capable of measuring extremely high vacuums, the linear scale thereon being adapted to measure pressures on the order of 0-100 millitorr or microns (the scales on the tube 18 in this embodiment being adapted to read pressures in the range of 0.001-5.0 millitorr or microns). The bypass 20a permits the more rapid application of the vacuum of the test source to the pressure measuring fluid because of its wider internal capillary diameter (relative to main portion 20b). The use of a bypass for this purpose is well known in the pressure gauge art and need not be described in further detail herein. It should be noted however that the need for use of a bypass can be avoided by increasing the internal capillary diameter, and that the bypass principle may be utilized in connection with piston-type gauges whenever the ability to measure higher vacuums is required.

Figure 3:
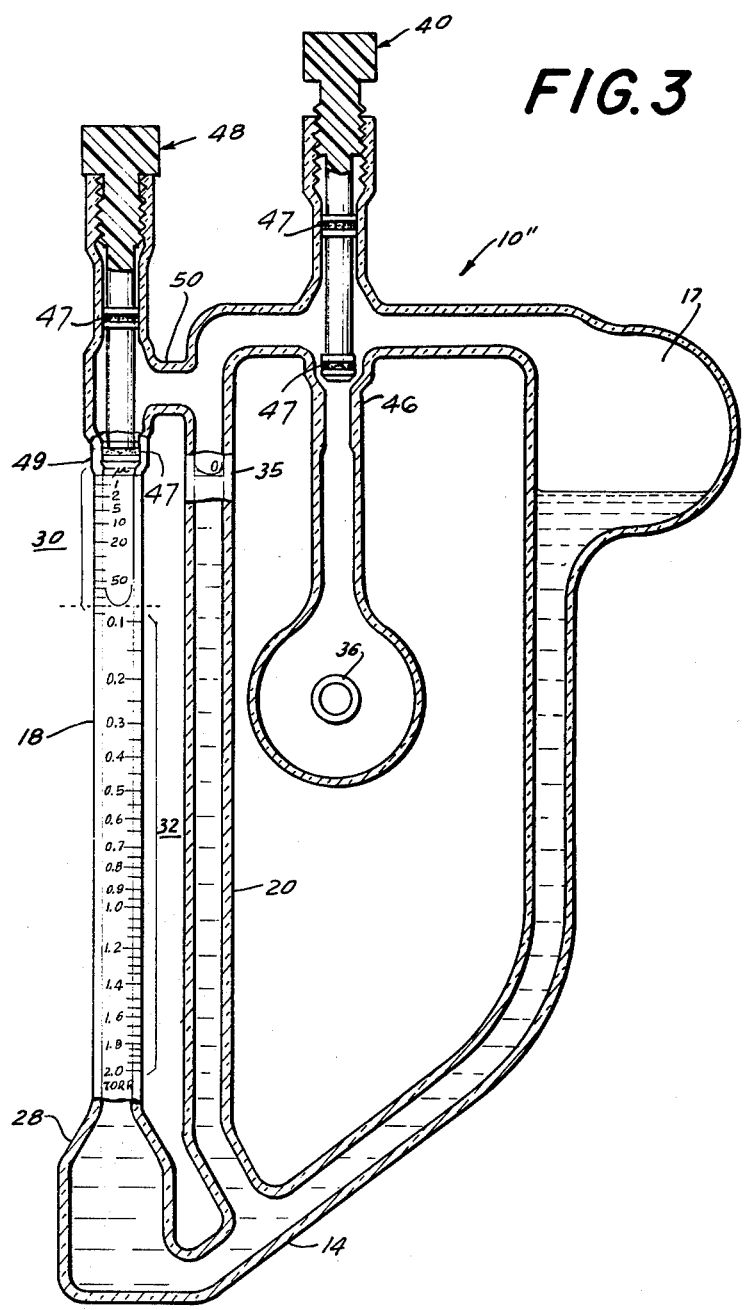
FIG. 3 is a front elevation view of a tilting type McLeod gauge according to the present invention.

Referring now to FIG. 3, therein illustrated is a tilting type of McLeod gauge, generally designated 10'', according to the present invention. The gauge 10'' is generally of the type described in the article "New Tilting Gauge Improves Accuracy," *Vacuum Technology* (November, 1962) pages 50-52. In its conventional aspects, the gauge 10'' as shown differs from that described therein in that the rather complex check valve system described therein to protect the gauge from the system pressure is omitted. A valve 40 is employed for the same purpose, the valve 40 in its closed or lowered position sealing the reservoir 17 and tube 20 from the external system pressure and in its open or raised position exposing both thereto. In practice, it is recommended that, to provide redundancy and hence greater protection, both the complex check valve system and valve 40 be employed in gauge 10''. In its novel aspects the gauge 10'' differs from that disclosed in the article in that the Teflon plug in tube 18 is replaced by valve 48, the bridge securing the plug within the tube 18 is dispensed with, and there is provided a transversely-extending passage 50 between the upper portions of the tubes 18 and 20.

The tube 20 acts merely as a comparison capillary and thus contains no scale, but only a simple zero level indicator 35. The tube 18 bears a non-linear scale comprising graduations 30 in microns and 32 in millimeters of mercury or Torr.

To use the gauge, it is first connected by nipple 36 to the system under test and the gauge placed in a horizontal position so that all of the pressure measuring fluid collects in the reservoir 60. To take a reading, the gauge is carefully tilted to a vertical position (as shown in FIG. 3). The pressure measuring liquid will run into the comparison capillary tube 20 and the bulb 28, compressing the trapped sample of attenuated gas in the tube 18. With the liquid level reading zero in the comparison capillary tube 20, the liquid in the tube 18 will indicate the vacuum in the system. In FIG. 3, the reading is 80 microns of mercury or millitorr. To prepare for another reading, the gauge is carefully returned to the horizontal position until all of the liquid has returned to reservoir 60.

The common feature of the three embodiments discussed in detail above which distinguishes them from the prior art gauges is the existence of a passageway or fluid communication means 50 and a valve 48 in tube 18, the valve 48 and passage 50 being adapted together to enable or disable fluid communication between the tops of tubes 18 and 20. Thus before any series of reading is taken, it is possible to turn valve 48 to its open position, thereby allowing any vapor trapped in the top of tube 18 (above the level of the pressure measuring fluid) to escape therefrom through the passage 50. This is conveniently done by applying the vacuum to the top of tube 20. The ability to easily and inexpensively degas the liquid enables the use of a pressure measuring liquid having a relatively high gas absorption compared to mercury. These alternative pressure measuring liquids are preferably low density, non-volatile liquids, such as silicone oil, to enable the gauge to be made more economical (becuase of the relatively low cost of the liquid) and more sensitive (because of the lower density of the liquid). Furthermore, the alternative pressure measuring liquid may be selected so as not to have deleterious effects on the system whose pressure is to be measured, thereby to avoid the poisoning, amalgamation and other undesirable effects of mercury. Of course, if desired, mercury may still be used as the liquid.

Another common feature of these embodiments is the use of a system isolating valve 40. While, as indicated before, this is not a necessary element of the present invention, it is a feature of extreme desirability where the pressure measuring liquid is highly gas-absorbent (for example, silicone oil). In such a case valve 40 provides a means for disconnecting the gauge from the vacuum system without the liquid being exposed to the ambient atmosphere. Thus the gauge may be disconnected from one pressure source and reconnected to another without the pressure measuring liquid being exposed to atmosphere and hence without requiring a second degassing. Another advantage of valve 40 is that it permits one to determine to what extent the gauge contains leaks. For example, after the valve 40 has been closed and the gauge isolated from the vacuum system, the immediate reading of the gauge may be checked against the reading a week later to determine whether the pressure within the gauge has varied.

A further advantage of the present system is the ability to check any meniscus error by opening valve 48 with the gauge under vacuum. Then by raising the liquid into both capilliaries, the meniscuses should be at the same level at all readings.

It will be appreciated that the valve seats 46, 49 are formed with effective inner diameter precisely dimensioned to be appropriate for the particular valve stems 44 (including O-rings 47, where appropriate) adapted to seat thereon. Furthermore, the bottom of the valve 48 is configured and dimensioned so that when the valve 48 is seated in valve seat 49 the position thereof relative to the zero pressure line and the configuration thereof relative to the fluid meniscus is appropriate to correct for the meniscus and permit reading of the meniscus bottom (see horizontal dotted line across tube 18 in each Figure).

While only a limited number of embodiments of the present invention have been disclosed, it will be apparent that many variations may be made therein, all without departing from the spirit of the invention as defined in the following claims.

I claim:

1. In a pressure gauge comprising a body having a first passage; a second passage; a reservoir adapted to contain a supply of liquid; first fluid communication means between one end of each of said passages and said reservoir, the other end of said first passage being adapted to be connected to a source the pressure of which is to be measured; and means for causing liquid in said reservoir to enter and leave said passages, said gauge being adapted to be used in conjunction with scale means associated with said passages for reading the levels of liquid in said passages;

the improvement comprising second fluid communication means in said body between the other ends of said passages, and means operatively connected to the other end of said second passage and movable between first and second positions, said movable means in said first position closing said other end of said second passage from said second fluid communication means and said movable means in said second position opening said other end of said second passage to said second fluid communication means.

2. The gauge of claim 1 wherein said movable means is rotatably disposed within said other end of said second passage.

3. The gauge of claim 2 wherein said movable means is a controllable valve means.

4. The gauge of claim 1 wherein said second passage includes an internally threaded portion and said movable means includes an externally threaded portion, said movable means portion being in threaded rotatable engagement with said second passage portion.

5. The gauge of claim 1 additionally including system isolating means operatively connected to said other end of said first passage and movable between first and second positions, said system isolating means in said first position being adapted to isolate said first passage from said pressure source and in said second position being adapted to allow fluid communication between said source and said first passage.

6. The gauge of claim 5 wherein said system isolating means is a controllable valve means.

7. The gauge of claim 5 wherein said other end of second passage and said source are in fluid communication when said movable means and said system isolating means are both in their second position.

8. The gauge of claim 1 wherein said reservoir contains a low-density, non-volatile liquid.

9. The gauge of claim 8 wherein said reservoir contains silicone oil.

* * * * *